United States Patent
Xu

(10) Patent No.: US 11,667,019 B2
(45) Date of Patent: Jun. 6, 2023

(54) DRIVING MECHANISM FOR FASTENER DRIVING MACHINE

(71) Applicant: Ying Xu, Dongguan (CN)

(72) Inventor: Ying Xu, Dongguan (CN)

(73) Assignee: Uniwisdom Technology (Suzhou) Co., Ltd, Suzhou (CN)

( * ) Notice: Subject to any disclaimer, the term of this patent is extended or adjusted under 35 U.S.C. 154(b) by 103 days.

(21) Appl. No.: 17/123,114

(22) Filed: Dec. 16, 2020

(65) Prior Publication Data
US 2022/0184787 A1   Jun. 16, 2022

(51) Int. Cl.
*B25C 1/04* (2006.01)
*F16H 21/36* (2006.01)
*F16H 21/38* (2006.01)

(52) U.S. Cl.
CPC .............. *B25C 1/047* (2013.01); *F16H 21/36* (2013.01); *F16H 21/38* (2013.01)

(58) Field of Classification Search
CPC .. B25C 1/047; B25C 1/04; B25C 1/06; B25C 1/00; F16H 21/36
See application file for complete search history.

(56) References Cited

U.S. PATENT DOCUMENTS

| | | | | |
|---|---|---|---|---|
| 2004/0232194 | A1* | 11/2004 | Pedicini | B25C 1/06 227/131 |
| 2016/0288305 | A1* | 10/2016 | McCardle | B25C 1/047 |
| 2020/0147774 | A1* | 5/2020 | Shi | B25C 7/00 |
| 2020/0164498 | A1* | 5/2020 | Wechselberger | B25C 1/047 |

* cited by examiner

*Primary Examiner* — Anna K Kinsaul
*Assistant Examiner* — Veronica Martin

(57) ABSTRACT

A driving mechanism for fastener driving machine, including a rotatable crank; a driving rack element rotatably installed on the crank, which comprises an engaging element, a support element and a driving rack; at least one fixed guide element. The support element and/or engaging element can move along the set trajectory. The present invention has a simple structure, a few parts and stable operation. When the crank rotates, the motion trajectory of the engaging element is straight or approximately 0°, so as to reduce the kinetic friction force of load to the maximum extent, preventing wear problem, and guaranteeing constant direction of thrust on the impact unit in the course of compressed energy storage and low eccentric load in late stage, the quick release of driving mechanism is implemented, the operational stability and smoothness of impact unit are guaranteed, the work quality is upgraded.

8 Claims, 13 Drawing Sheets

DRIVING MECHANISM FOR FASTENER DRIVING MACHINE

BACKGROUND OF INVENTION

1. Field of the Invention

The present invention relates generally to the technical field of machine tool products, and more particularly to a driving mechanism for fastener driving machine.

2. Description of Related Art

In a quick fastening machine (also known as nailing gun or fastener driving machine), the energy storage medium (e.g. gas, spring, rubber, vacuum) is usually compressed to store energy, and then the energy is released quickly to apply work to the outside.

The common driving mechanisms convert rotary motion into reciprocating motion, the structure is crank-connecting rod structure, but this structure has very large stress inclination in the course of motion, which is to say, when the angle of connecting rod is large and the inclination is too large, the kinetic friction force of load (impact unit) increases, and the mechanism is worn, the product service life is affected.

Additionally, how to make the driving mechanism implement quick release after the energy storage medium is compressed becomes the difficulty in the design process of this kind of mechanical equipments.

In view of this, this inventor proposes the following technical proposal.

SUMMARY OF THE INVENTION

The purpose of the present invention is to overcome the shortcomings of the prior art and provide a driving mechanism for fastener driving machine, comprising a rotatable crank;

a driving rack element rotatably installed on crank, including an engaging element, a support element and a driving rack; at least a fixed guide element, the support element and/or engaging element can move along the set trajectory.

More particularly, wherein the driving rack is rotatably installed on crank, the engaging element and support element are installed on the driving rack.

More particularly, wherein the guide element is provided with at least one guide slot as trajectory, the support element and/or engaging element is slideably arranged in the guide slot.

More particularly, wherein there are two of the guide slot, which are the first guide slot and the second guide slot, the engaging element and support element are slideably arranged in the first guide slot and the second guide slot respectively.

More particularly, the engaging element and support element are distributed on the driving rack along the circle centered on the rotation axis of driving rack, when the radius of the circle where the engaging element is distributed is equal to the distance between the spin axis of crank and the spin axis of driving rack, and the crank drives the driving rack to rotate, the motion trajectory of engaging element is a straight line, when the radius of the circle where the support element is distributed is equal to the distance between the spin axis of crank and the spin axis of driving rack, and the crank drives the driving rack to rotate, the motion trajectory of support element is a straight line.

More particularly, wherein the first guide slot and the second guide slot are arranged crosswise.

More particularly, wherein the engaging element and support element are cylindrical pins; an axle body is formed at the lower end of the driving rack, the axle body is rotatably installed on the crank.

More particularly, wherein the latching device is rotatably installed on the engaging element, wherein the latching device comprises a pendulum bar and a reset element on lateral side of the pendulum bar; an axle hole is formed at one end of the pendulum bar, the other end is provided with a locking shaft for engaging with the striker of impact unit.

More particularly, wherein the striker is slideably installed in the guide rail, the guide rail is installed on the base; the reset element is installed on the guide rail; the guide rail is provided with a release gear for driving the striker to be disengaged from the pendulum bar.

More particularly, wherein the release gear includes a release base installed on the side of guide rail, the release base is provided with a disengagement guide face for guiding the pendulum bar to be disengaged from the striker.

After adopting the above technical solution, compared with the prior art, the present invention has the following beneficial effects:

The present invention has a simple structure, a few parts and stable operation. When the crank 11 rotates, the driving rack 121 is driven to revolve around the rotation axis of crank 11, meanwhile the driving rack 121 rotates, and the engaging element 122 and support element 123 on the driving rack 121 slide in the first guide slot 131 and the second guide slot 132 respectively, so that the motion trajectory of the engaging element 122 is straight or approximately 0°, the inclination thereof is 0° or approximately 0°, the kinetic friction force of load is reduced to maximum extent, preventing wear problem, and guaranteeing constant direction of thrust on the impact unit in the course of compressed energy storage and low eccentric load in late stage, the quick release of driving mechanism is implemented, the operational stability and smoothness of impact unit are guaranteed, the work quality is upgraded, so that the present invention has very strong marketability. In addition, in the state of nail jamming, the present invention still can implement normal engagement with impact unit, guaranteeing normal operation, it is very convenient.

DETAILED DESCRIPTION OF THE INVENTION

Figure 1:
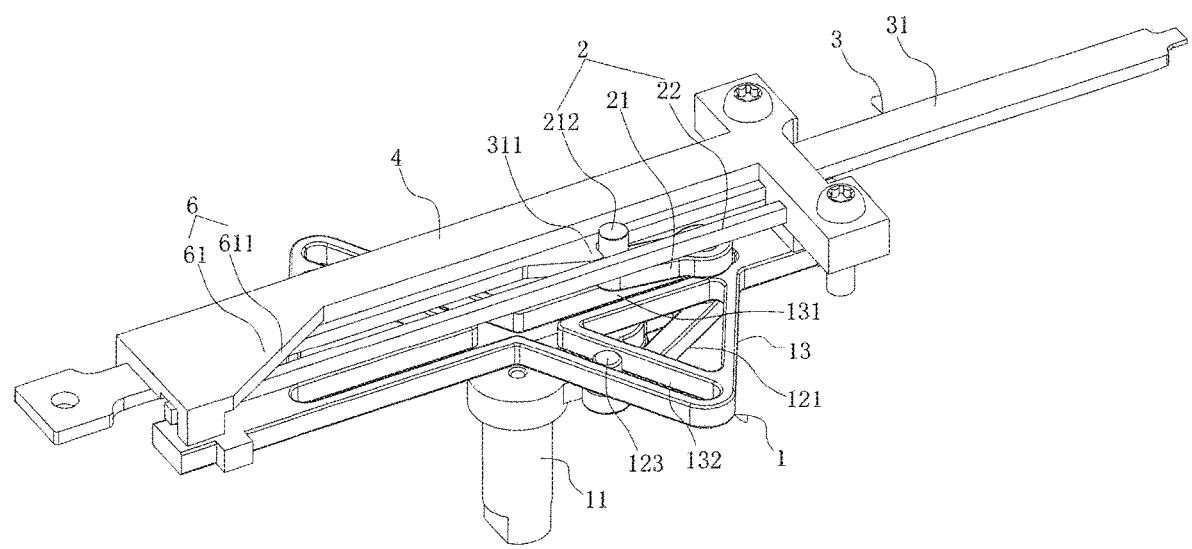
FIG. 1 is an assembly drawing of the present invention and latching device and impact unit.
Figure 2:
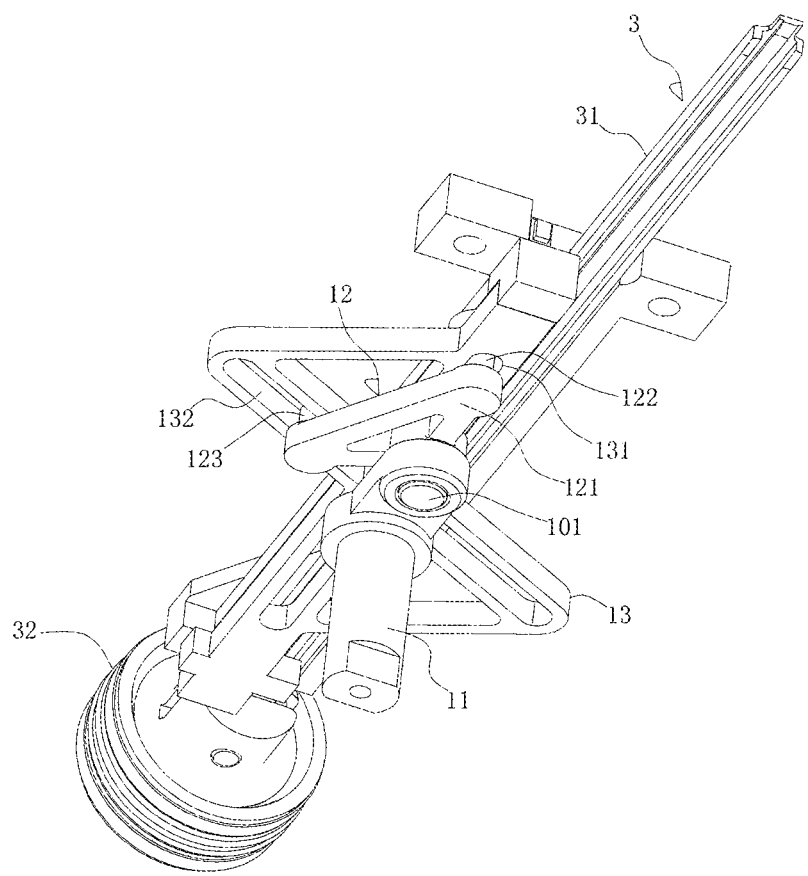
FIG. 2 is an assembly drawing from another viewing angle of the present invention and latching device and impact unit.
Figure 3:
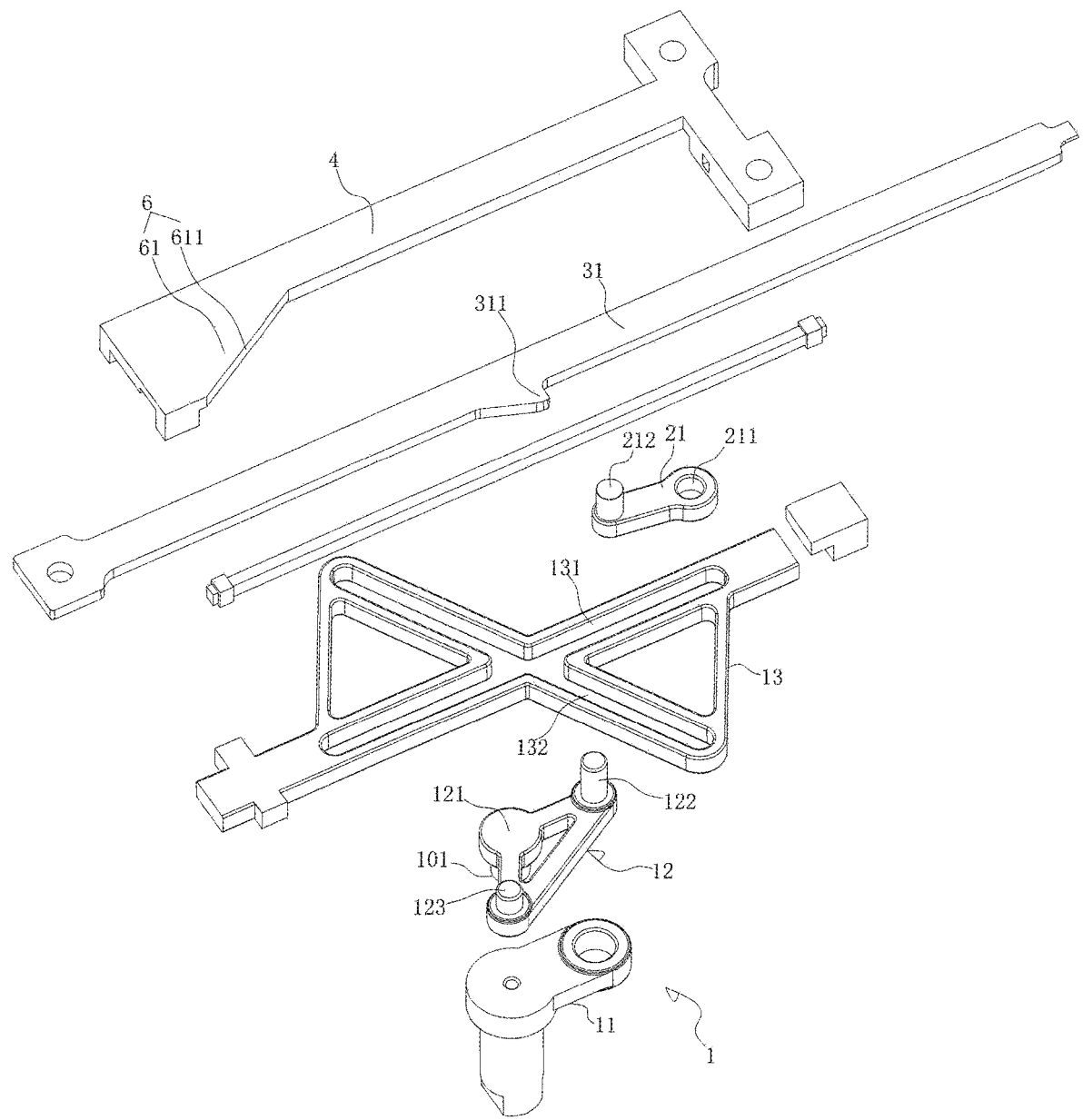
FIG. 3 is an exploded view of FIG. 1.
Figure 4:
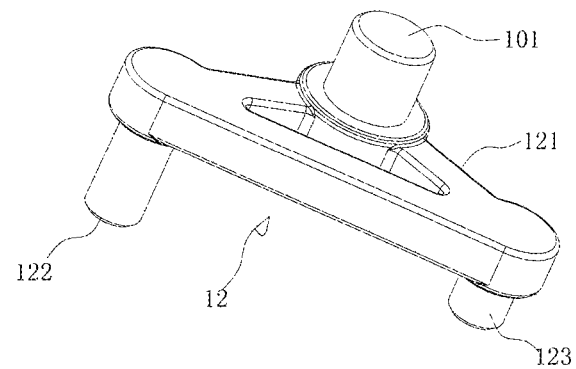
FIG. 4 is a stereogram of driving rack in the present invention.

Described with attached figures below.

FIGS. 1-15 show the driving mechanism for fastener driving machine, the driving mechanism 1 comprises a rotatable crank 11; a driving rack element 12 rotatably installed on crank 11, including an engaging element 122, a support element 123 and a driving rack 121, at least a fixed guide element 13, the support element 123 and/or engaging element 122 can move along the set trajectory. The present invention has a simple structure, a few parts and stable operation. When the crank 11 rotates, the driving rack 121 is driven to revolve around the rotation axis of crank 11, meanwhile the driving rack 121 rotates, and the engaging element 122 and support element 123 move along the trajectory respectively, so that the motion trajectory of the engaging element 122 is straight or approximately 0°, the inclination thereof is 0° or approximately 0°, the kinetic friction force of load is reduced to maximum extent, preventing wear problem, and guaranteeing constant direction of thrust on the impact unit in the course of compressed energy storage and low eccentric load in late stage, the quick release of driving mechanism is implemented, the operational stability and smoothness of impact unit are guaranteed, the work quality is upgraded, so that the present invention has very strong marketability.

As stated above, the driving rack 121 is rotatably installed on crank 11, the engaging element 122 and support element 123 are installed on the driving rack 121. The guide element 13 is provided with at least one guide slot as trajectory. The guide slot is used for confining the motion trajectory. The support element 123 and/or engaging element 122 is slideably arranged in the guide slot. To be more specific, the guide element 13 is provided with a first guide slot 131 and a second guide slot 132 as trajectory, the first guide slot 131 and the second guide slot 132 are used for confining the motion trajectory. The engaging element 122 and support element 123 are slideably arranged in the first guide slot 131 and the second guide slot 132 respectively. When the crank 11 rotates, the driving rack 121 is driven to revolve around the rotation axis of crank 11, meanwhile the driving rack 121 rotates, and the engaging element 122 and support element 123 on the driving rack 121 slide in the first guide slot 131 and the second guide slot 132 respectively, so that the motion trajectory of the engaging element 122 is straight or approximately 0°, the inclination thereof is 0° or approximately 0°.

The engaging element 122 and support element 123 are distributed on the driving rack 121 along the circle centered on the rotation axis of driving rack 121. When the radius of the circle where the engaging element 122 is distributed is equal to the distance between the spin axis of crank 11 and the spin axis of driving rack 121, and the crank 11 drives the driving rack 121 to rotate, the motion trajectory of engaging element 122 is a straight line. When the radius of the circle where the support element 123 is distributed is equal to the distance between the spin axis of crank 11 and the spin axis of driving rack 121, and the crank 11 drives driving rack 121 to rotate, the motion trajectory of support element 123 is a straight line.

In other words, the rotation axis of the crank 11 is A, the center of position of engaging element is B, the center of position of support element is C, and the rotation center of driving rack is O. When OA=OB, the motion trajectory of engaging element 122 is a straight line, the corresponding first guide slot 131 is straight. When OA≠OB, the motion trajectory of engaging element 122 is elliptic, the corresponding first guide slot 131 is elliptic. When OA=OC, the motion trajectory of support element is a straight line, the corresponding second guide slot 132 is straight. When OA≠OC, the motion trajectory of support element is elliptic, the corresponding second guide slot 132 is elliptic. When OA=OB=OC, if the first guide slot 131 and the second guide slot 132 are straight, and the included angle between two guide slots is a and the included angle between OB and OC is θ, then θ=2a.

The first guide slot 131 and the second guide slot 132 are arranged crosswise on the same plane, and they communicate with each other at the intersection. In addition, the first guide slot 131 and the second guide slot 132 can be uncrossed, or on different planes.

The engaging element 122 and support element 123 are cylindrical pins, the structure is simpler. An axle body 101 is formed at the lower end of the driving rack 121, the axle body 101 is rotatably installed on the crank 11. In addition, the axle body 101 may not be rotatably installed on the crank, and may not be subject to the driving rack. The axle body 101 can be fixed to the crank, then the driving rack rotates round the axle body, so as to implement rotary motion of driving rack in relation to the crank.

The upper end of the engaging element 122 projects outside the upper end face of the guide element 13 through the first guide slot 131. The latching device 2 is rotatably installed on the upper end or lower end of the engaging element 122. To be specific, the latching device 2 can perform linear or approximately linear movement with the linear or approximately linear movement of driving mechanism 1. When the impact unit moves in the first direction, the latching device engages with impact unit, driving it to move in the first direction, so that the energy storage unit stores energy.

The latching device 2 comprises a pendulum bar 21 and a reset element 22 by the pendulum bar 21. An axle hole 211 is formed in one end of the pendulum bar 21, a locking shaft 212 for engaging with the striker 31 of impact unit 3 is arranged at the other end. Wherein the striker 31 has a sawtooth 311 engaging with the locking shaft 212. The sawtooth 311 has a bevel guide face, so that the locking shaft 212 slides along the bevel guide face to get over the sawtooth 311 in late stage, and to be locked with the sawtooth 311.

The reset element 22 is an elastic element. The elastic element includes a spring or an elastic rubber. In this embodiment, the reset element 22 is a rubber strip, which is parallel with the striker 31, and the rubber strip is arranged on lateral side of the locking shaft 212. The rubber strip can provide a force to make the locking shaft 212 cling to the striker.

The striker 31 is slideably installed in a guide rail 4, so as to guarantee the sliding smoothness of striker 31, as well as the running direction. The guide rail 4 is installed on a base 5. The reset element 22 is installed on the guide rail 4. Certainly, the reset element may not be installed on the guide rail, it can be arranged in other positions, e.g. base, as long as a force for resetting the pendulum bar can be provided. The guide rail 4 is provided with a release gear 6 for driving the striker 31 to be disengaged from the pendulum bar 21. To be specific, the release gear 6 includes a release base 61 installed on lateral side of guide rail 4. The release base 61 is provided with a disengagement guide face 611 for guiding the pendulum bar 21 to be disengaged from the striker 31. When the latching device 2 pushes the impact unit 3 to move in the first direction for a certain distance, the latching device will engage with this disengagement guide face 611. For the restriction of bevel face, the locking shaft 212 at the end of pendulum bar 21 receives a force normal to the first direction while moving in the first direction. At this point, the pendulum bar 21 can rotate round the engaging element 122, so as to push the latching device to be disengaged from the impact unit. After disengagement, the impact unit moves in the second direction under the force of energy storage unit, so as to implement the fastener driving function. When the latching device does not engage with the disengagement guide face 611, the elastic force of rubber strip resets the pendulum bar 21, so as to engage with the striker 31 again.

The guide element 13 is fixed to the base 5. The base 5 is provided with an energy storage unit 7 which implements energy storage by displacement variation. The impact unit 3 is connected to energy storage unit 7. In addition, the base 5 is provided with an actuating unit 8. The crank 11 is installed on the actuating unit 8, and driven by the actuating unit 8 to rotate. The actuating unit 8 comprises a tooth gear 81 installed at the lower end of the base 5 and a motor 82 matching the tooth gear 81. The motor 82 provides torsion and speed. The tooth gear is generally a reducer casing for reducing the speed and increasing the torsion. The crank 11 is installed on the tooth gear 81.

The energy storage unit 7 is a medium which can implement energy storage by displacement variation, e.g. air spring, mechanical spring, rubber element, vacuum and so on. The air spring is taken as an example in this embodiment, a cylinder and a piston form a confined space which contains gas, so as to compose an air spring.

The energy storage unit can store energy when the impact unit 3 moves in the first direction. The fastener can be driven in the workpiece when the impact unit 3 moves in the second direction. The first direction refers to the impact unit 3 to energy storage unit 7 direction, the second direction refers to the energy storage unit 7 to impact unit 3 direction.

The impact unit 3 comprises a piston 32 disposed in the energy storage unit 7 and a striker 31 installed on the piston 32.

The base 5 is provided with a buffer 50 for colliding with the piston 32 in the impact unit 3, so as to absorb shock, and to avoid excessive impact damaging the mechanism.

The base 5 is equipped with a nail guide plate 51 and a nail clip 52 arranged at the lower end of the nail guide plate 51 for delivering fasteners to the nail guide plate 51. The nail guide plate 51 has a channel for the striker 31 of impact unit 3 to pass through. The nail clip 52 is a fastener loading device, delivering fasteners (e.g. nails) to the nail guide plate. The nail guide plate 51 receives fasteners from the nail clip. When a fastener falls into the channel of nail guide plate 51, the striker 31 of the impact unit passes through the channel when the energy storage unit 7 releases energy to impact, and the fastener (e.g. nail) in the channel is driven into the workpiece (generally wood, metal plate or cement).

Figure 5:
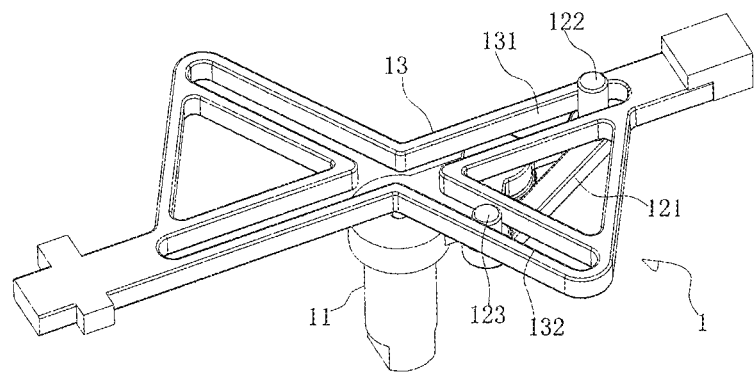
FIG. 5 is a stereogram of the present invention.
Figure 6:
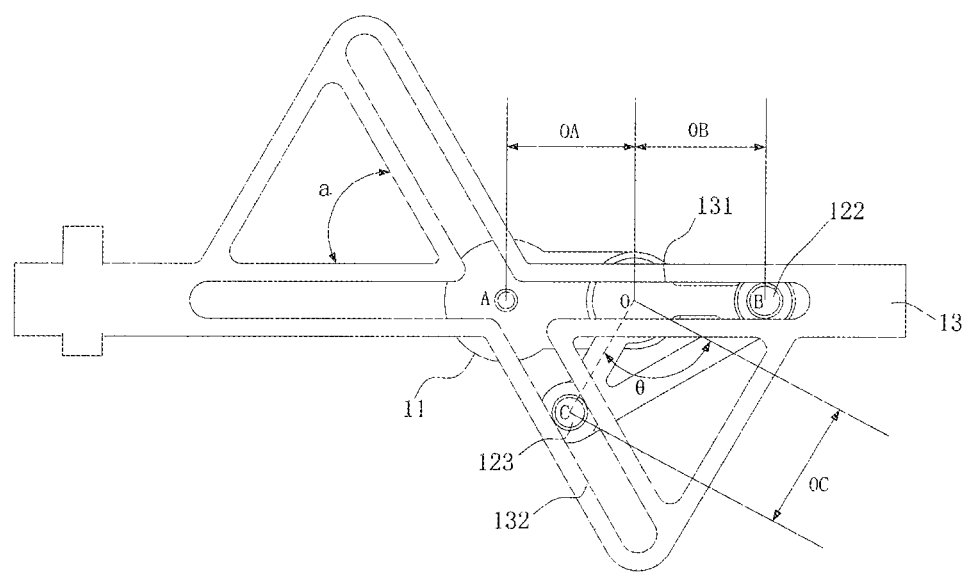
FIG. 6 is a functional diagram of the present invention.
Figure 7:
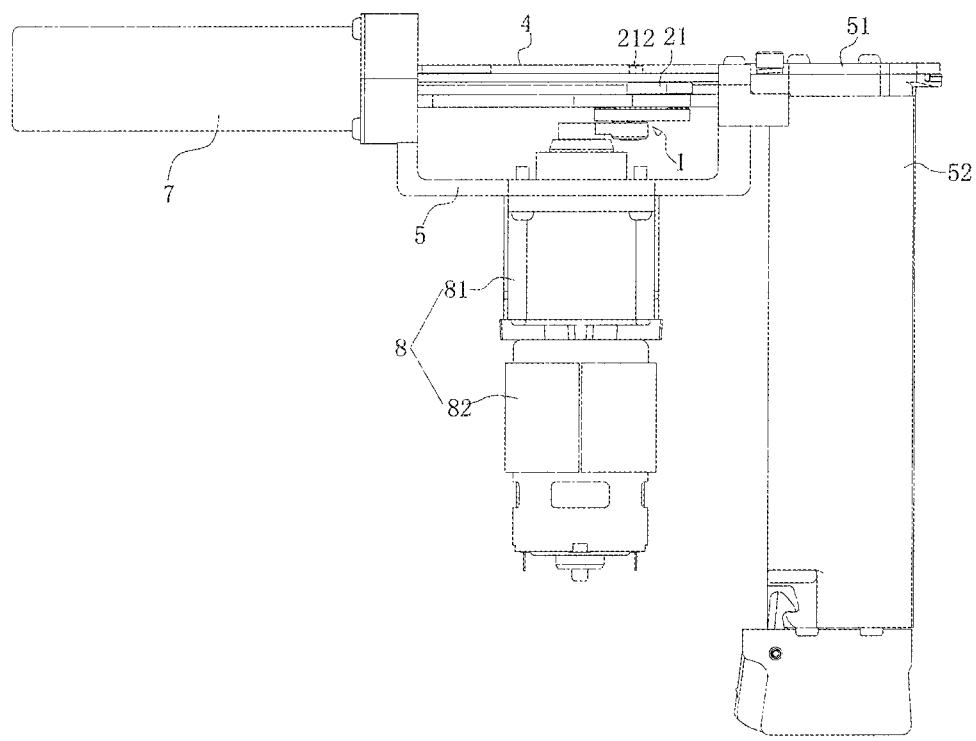
FIG. 7 is a front view of fastener driving machine including the present invention.
Figure 8:
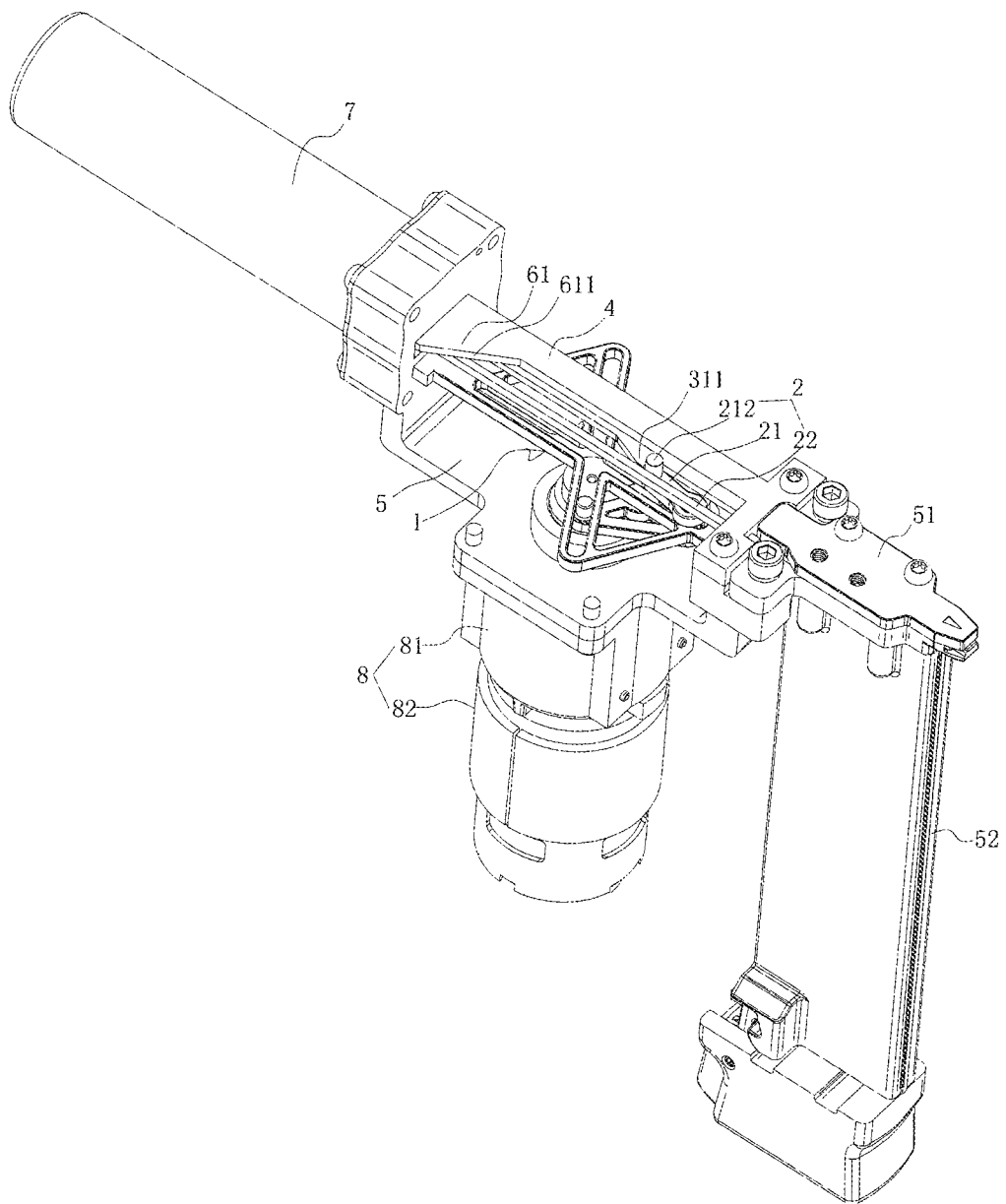
FIG. 8 is a stereogram of fastener driving machine including the present invention.
Figure 9:
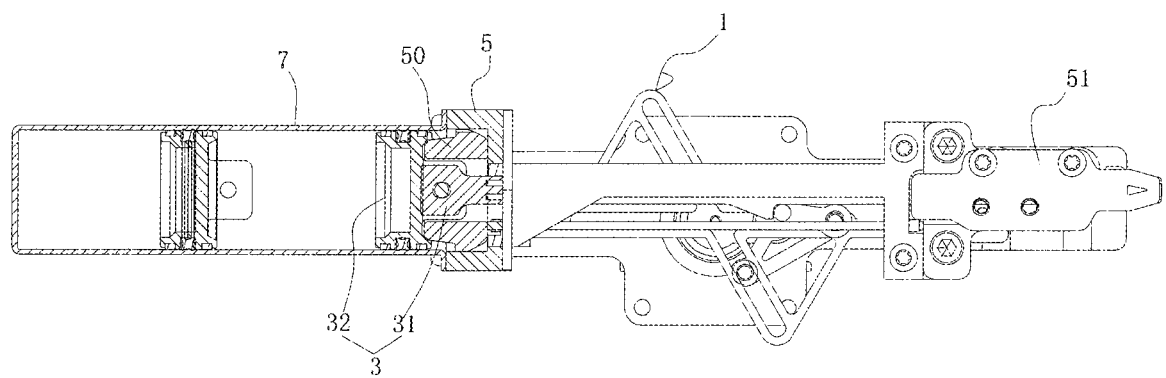
FIG. 9 is a sectional view of fastener driving machine including the present invention.

As shown in FIGS. 5-6, when the crank 11 rotates, if OA=OB, the engaging element is in rectilinear motion, if OA is unequal to OB, the motion trajectory of engaging element 122 is elliptic. When the difference between OA and OB is small, the minor axis of ellipse is short, the motion trajectory of engaging element 122 can be regarded as approximate straightline motion. OA=OB is preferred, so that the engaging element is in rectilinear motion, and the eccentric load is small when the impact unit moves in the first direction. Similarly, if OA=OC, the support element 123 is in rectilinear motion. If OA is unequal to OC, the motion trajectory of support element is elliptic. When the difference between OA and OC is small, the minor axis of ellipse is short, the motion trajectory of support element can be regarded as approximate straightline motion. The engaging element 122 and support element 123 are unnecessary to perform rectilinear motion simultaneously, the OB may not be equal to OC. To simplify design, OA=OB=OC is preferred, so that the shapes of the first guide slot 131 and the second guide slot 132 can be further simplified, the engaging element and support element perform rectilinear motion. At this point, the included angle α between two guide slots is half of the included angle θ between OB and OC.

As shown in FIGS. 5-6, when the engaging element 122 passes by Point A and nearby region, the second guide slot 132 coordinates with support element 123, providing a holding power for the driving rack 121, so that the driving rack 121 keeps rotating in the direction opposite to crank 11, maintaining the motion of engaging element in the direction of the first guide slot 131. Similarly, when the support element passes by Point A and nearby region, the first guide slot 131 coordinates with the engaging element 122 to support the driving rack, so as to maintain the motion of support element 123 in the direction of the second guide slot 132. When the engaging element 122 and support element 123 are not at Point A or in nearby region, only one of the first guide slot 131 and the second guide slot 132 is required as support.

Figure 10:
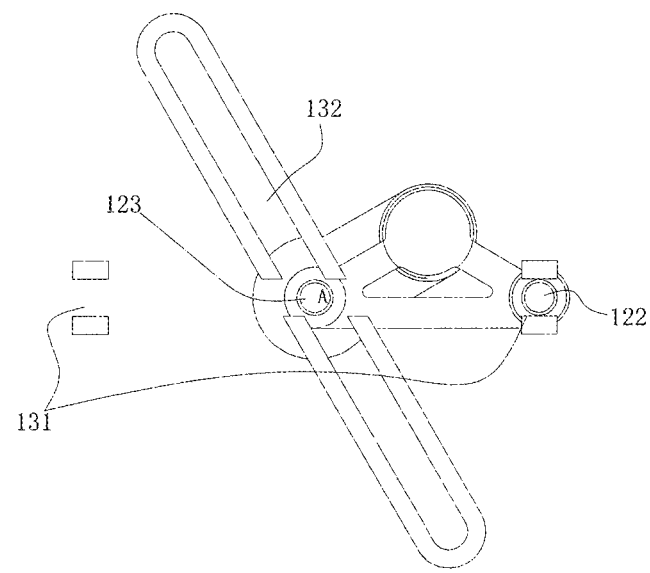
FIG. 10 is a schematic diagram of the second structure of the present invention.
Figure 11:
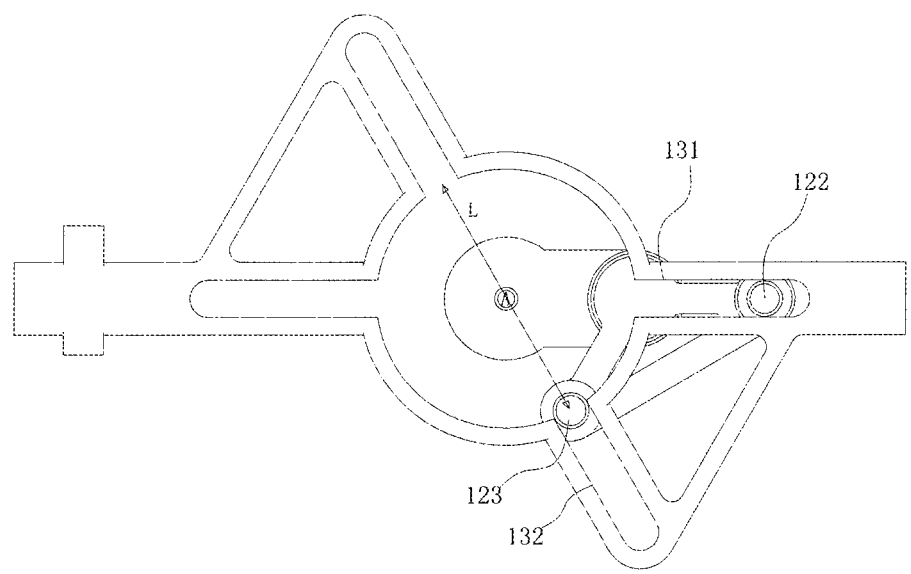
FIG. 11 is a schematic diagram of the third structure of the present invention.

Therefore, the length of the first guide slot 131 and the second guide slot 132 is not required to cover the overall stroke of engaging element 122 and support element 123. FIGS. 10-11 show two incomplete forms of guide slot, the other forms, as long as the operating principle is the same, are within the scope of protection of the present invention. As shown in FIG. 10, two guide slots have unequal lengths, the first guide slot degrades into two short straight slots, supporting only when the support element passes by Point A and nearby region. As shown in FIG. 11, the middle of two guide slots is hollowed for the same length L. As shown in FIG. 6 and FIG. 11, if the included angle between OC and OB is θ, and θ changes within 0° to 180°, OA=OB=OC=R, then L=(2√2)*R*(√(1−cos(θ/2))). If θ=180°, then L=(2√2)*R, the √ is radical sign.

Figure 12:
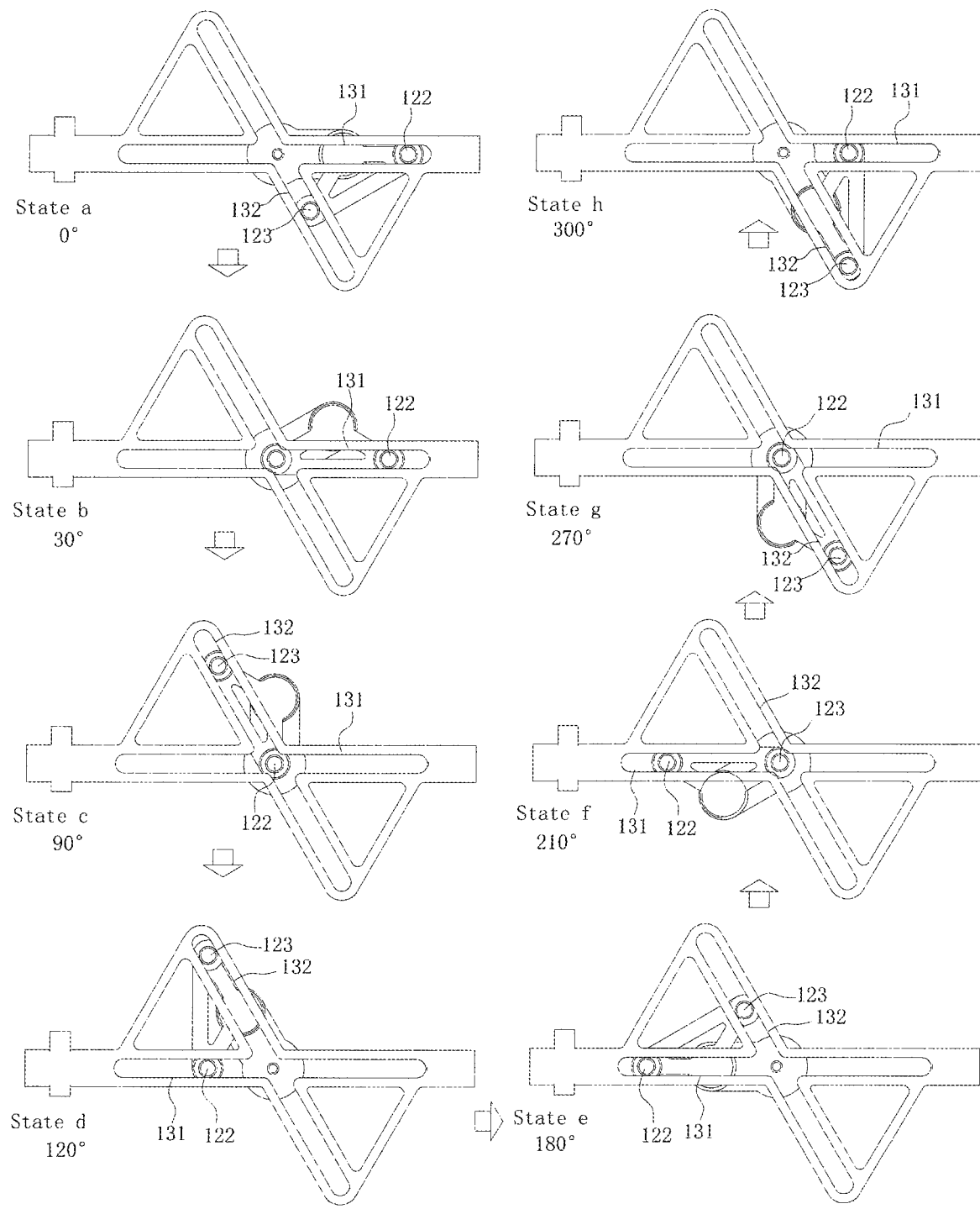
FIG. 12 is a running state diagram of the present invention.

As shown in FIGS. 6 and 12, States a-h show a completed motion cycle of driving mechanism under the condition of OA=OB=OC. The included angle between OB and OC is 120°, the included angle α between the first guide slot 131 and the second guide slot 132 is 60°. State a is initial state, the engaging element is located at the lower dead point in the first direction. The crank rotates counterclockwise, the engaging element moves in the first direction, the support element moves along the second guide slot 132. The crank rotates 30° counterclockwise, see State b, the support element moves to Point A, the driving rack and engaging element are supported by the first guide slot 131. The crank rotates 90° counterclockwise, see State c, the engaging element moves to Point A, the driving rack and support element are supported by the second guide slot 132. The crank rotates 120° counterclockwise, see State d, the support element moves to the upper dead point in the direction of the second guide slot 132. The cranks continues rotating, the support element moves in the direction opposite to the second guide slot 132. The crank rotates 180° counterclockwise, see State e, the engaging element moves to the upper dead point in the first direction. The crank continues rotating, the engaging element moves in the second direction. The crank rotates 210° counterclockwise, see State f, the support element moves to Point A, the driving rack and engaging element are supported by the first guide slot 131. The crank rotates 270° counterclockwise, see State g, the engaging element moves to Point A in the second direction, the driving rack and support element are supported by the second guide slot 132. The crank rotates 300° counterclockwise, see State h, the support element moves to the lower dead point in the direction opposite to the second guide slot 132. The crank rotates 360° counterclockwise, the driving mechanism returns to initial state a.

Figure 13:
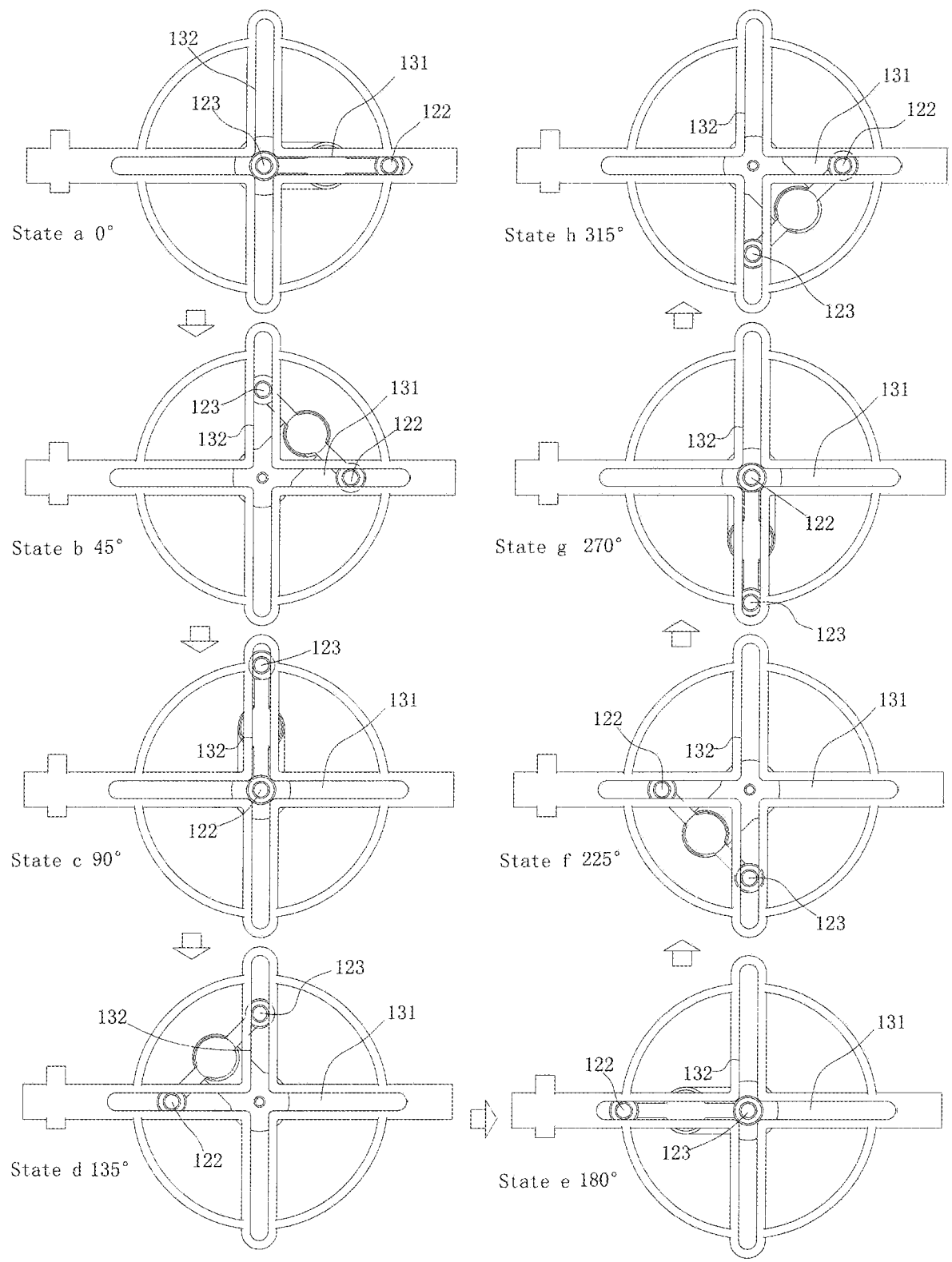
FIG. 13 is a running state diagram of another structure of the present invention.

As shown in FIGS. 6 and 13, the included angle between OB and OC is 180°, the included angle α between the first guide slot 131 and the second guide slot 132 is 90°. The motion cycle is similar to that when the included angle between OB and OC is 120°, but the corresponding crank rotation angle is different when the engaging unit and support unit pass by Point A. When the crank rotates 0° counterclockwise, see State a; the crank rotates 180° counterclockwise, see State e, the support element moves to Point A, the driving rack and engaging element are supported by the first guide slot. The crank rotates 90° counterclockwise, see State c; the crank rotates 270° counterclockwise, see State g, the engaging element moves to Point A, the driving rack and support element are supported by the second guide slot.

Figure 14:
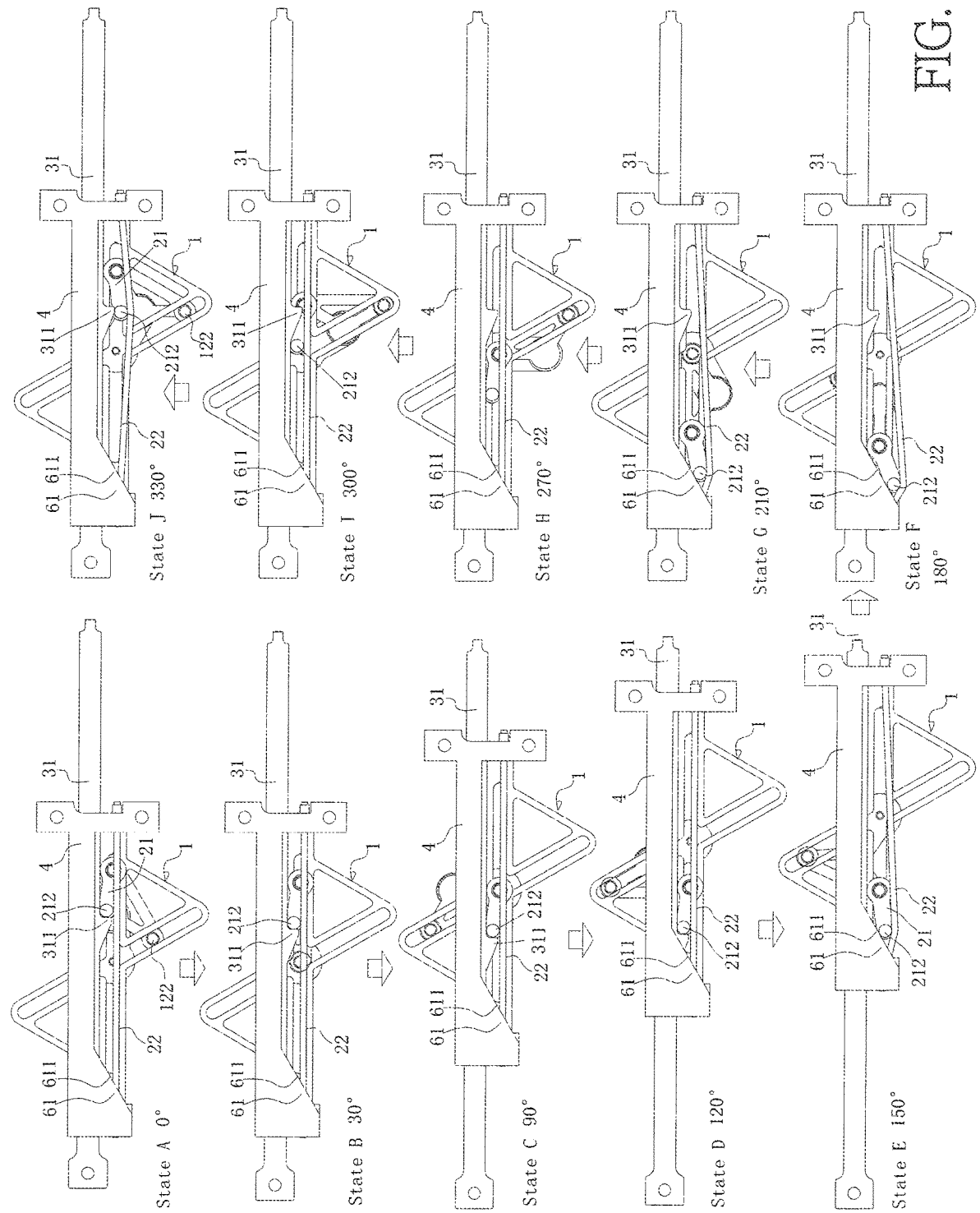
FIG. 14 is a running state diagram of fastener driving machine including the present invention.

As shown in FIGS. 6 and 14, States A-J correspond to a working cycle when OA=OB=OC and the included angle between OB and OC is 120°. As shown in State A, in initial state, the impact unit is located in the position where the fastener has been driven in, the crank rotates counterclockwise, driving the engaging element to move in the first direction. The latching device is installed above, engaging with the impact unit, so as to drive the impact unit to move in the first direction, the air spring is compressed, as shown in States B, C and D. The crank continues rotating counterclockwise, the locking shaft engages with the disengagement guide face 611 of release gear 6, pushing the pendulum bar to revolve around the engaging element, till the locking shaft is disengaged from the impact unit, as shown in State E. The impact unit moves fast in the second direction under the acting force of air spring, driving the fastener into the workpiece, as shown in State F. The crank continues rotating counterclockwise, as shown in States G and H, the engaging element moves in the second direction, the latching device rotates oppositely under the effect of reset element till it contacts the side of striker. The crank continues rotating counterclockwise, as shown in States I and J, the engaging element moves in the second direction, the latching device gets over the sawtooth of striker, and it is resetted under the effect of reset element, it engages with the impact unit at last, returning to State A.

Figure 15:
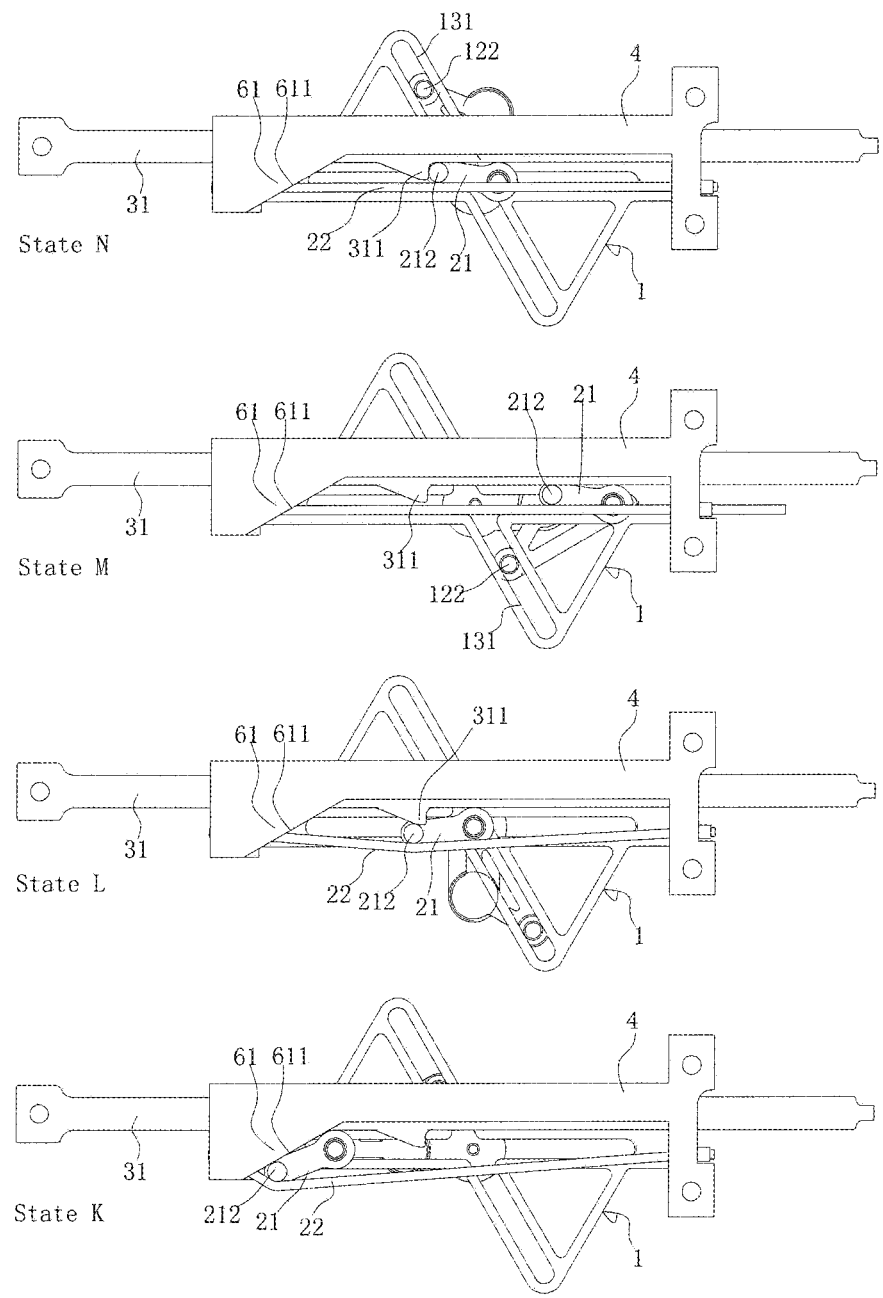
FIG. 15 is a mechanism running state diagram of fastener driving machine including the present invention in the state of nail jamming.

FIGS. 6 and 15 show the mechanism running state of the present invention in the state of nail jamming, and the nail jamming state analysis when OA=OB=OC and the included angle between OB and OC is 120°. When the nail jamming occurs for some reason, the fastener is stuck in the nail guide plate, the impact unit may stop in any position in the second direction, as shown in State K, the crank is driven by the motor to rotate counterclockwise, pushing the engaging element and latching device to move in the second direction to the same distance as normal working cycle, the latching device gets over the sawtooth of striker and clings to the side of striker under the effect of reset element, as shown in States L and M. The crank continues rotating counterclockwise, pushing the engaging element and latching device to move in the first direction till reengaging with the striker, as shown in State N. Afterwards, the striker moves in the first direction, compressing the air spring to store energy, as shown in State E, so as to return to normal working cycle. Which is to say, in the state of nail jamming, the present invention still can implement normal engagement with impact unit, guaranteeing normal operation, it is very convenient.

To sum up, the present invention has a simple structure, a few parts and stable operation. When the crank 11 rotates, the driving rack 121 is driven to revolve around the rotation axis of crank 11, meanwhile the driving rack 121 rotates, and the engaging element 122 and support element 123 on the driving rack 121 slide in the first guide slot 131 and the second guide slot 132 respectively, so that the motion trajectory of the engaging element 122 is straight or approximately 0°, the inclination thereof is 0° or approximately 0°, the kinetic friction force of load is reduced to maximum extent, preventing wear problem, and guaranteeing constant direction of thrust on the impact unit in the course of compressed energy storage and low eccentric load in late stage, the quick release of driving mechanism is implemented, the operational stability and smoothness of impact unit are guaranteed, the work quality is upgraded, so that the present invention has very strong marketability. In addition, in the state of nail jamming, the present invention still can implement normal engagement with impact unit, guaranteeing normal operation, it is very convenient.

I claim:

1. A driving mechanism for fastener driving machine, comprising
   a rotatable crank (11);
   a driving rack element (12) rotatablely installed on the crank (11), including an engaging element (122), a support element (123) and a driving rack (121);
   at least a fixed guide element (13), wherein the support element (123) and/or the engaging element (122) can be moved along a trajectory provided by the fixed guide element (13);
   wherein the fixed guide element (13) is provided with at least one guide slot as trajectory, the support element (123) and/or the engaging element (122) is slideably arranged in the guide slot;
   wherein there are two of the guide slot, which are the first guide slot (131) and the second guide slot (132), the engaging element (122) and support element (123) are slideably arranged in the first guide slot (131) and the second guide slot (132) respectively.

2. The driving mechanism for fastener driving machine defined in claim 1, wherein the driving rack (121) is rotatablely installed on the crank (11), the engaging element (122) and support element (123) are installed on the driving rack (121).

3. The driving mechanism for fastener driving machine defined in claim 1, the engaging element (122) and support element (123) are distributed on the driving rack (121) along a circle centered on the rotation axis of driving rack (121), when the radius of the circle where the engaging element (122) is distributed is equal to the distance between a spin axis of the crank (11) and a spin axis of the driving rack (121), and the crank (11) drives the driving rack (121) to rotate, a motion trajectory of the engaging element (122) is a straight line, when the radius of the circle where the support element (123) is distributed is equal to the distance between the spin axis of the crank (11) and the spin axis of the driving rack (121), and the crank (11) drives the driving rack (121) to rotate, the motion trajectory of the support element (123) is a straight line.

4. The driving mechanism for fastener driving machine defined in claim 1, wherein the first guide slot (131) and the second guide slot (132) are arranged crosswise.

5. The driving mechanism for fastener driving machine defined in claim 1, wherein the engaging element (122) and support element (123) are cylindrical pins; an axle body (101) is formed at the lower end of the driving rack (121), the axle body (101) is rotatablely installed on the crank (11).

6. The driving mechanism for fastener driving machine defined in claim 1, wherein a latching device (2) is rotatablely installed on the engaging element (122), wherein the latching device (2) comprises a pendulum bar (21) and a reset element (22) on lateral side of the pendulum bar (21); an axle hole (211) is formed at one end of the pendulum bar (21), the other, end is provided with a locking shaft (212) for engaging with a striker (31) of an impact unit (3).

7. The driving mechanism for fastener driving machine e defined in claim 6, wherein the striker (31) is slideably installed in a guide rail (4), the guide rail (4) is installed on a base (5); the reset element (22) is installed on the guide rail (4); the guide rail (4) is provided with a release gear (6) for driving the striker (31) to be disengaged from the pendulum bar (21).

8. The driving mechanism for fastener driving machine defined in claim 7, wherein the release gear (6) includes a release base (61) installed on the side of guide rail (4), the release base (61) is provided with a disengagement guide face (611) for guiding the pendulum bar (21) to be disengaged from the striker (31).

\* \* \* \* \*